United States Patent
Mase

(10) Patent No.: US 7,126,727 B2
(45) Date of Patent: Oct. 24, 2006

(54) SCANNER, LIGHTING APPARATUS, AND SCANNING METHOD

(75) Inventor: Yasufumi Mase, Aichi-ken (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 861 days.

(21) Appl. No.: 10/223,606

(22) Filed: Aug. 20, 2002

(65) Prior Publication Data

US 2003/0053149 A1 Mar. 20, 2003

(30) Foreign Application Priority Data

Aug. 31, 2001 (JP) ............................. 2001-263153

(51) Int. Cl.
*H04N 1/04* (2006.01)
(52) U.S. Cl. ...................... 358/475; 358/474; 358/497; 358/494
(58) Field of Classification Search ................ 358/475, 358/509, 474, 497, 494, 505, 487, 506; 348/218.1, 348/221.1, 211.14, 373, 340, 351, 357, 374, 348/362; 356/605–607; 250/234–236, 216, 250/239; 359/205; 382/312
See application file for complete search history.

(56) References Cited

U.S. PATENT DOCUMENTS

| | | | | |
|---|---|---|---|---|
| 4,574,318 A * | 3/1986 | Dayton et al. | ............... | 358/483 |
| 4,910,601 A * | 3/1990 | Gerlach | ................... | 358/474 |
| 5,084,611 A * | 1/1992 | Okisu et al. | ............. | 250/208.1 |
| 5,218,200 A * | 6/1993 | Morii et al. | ................. | 250/235 |
| 5,416,609 A * | 5/1995 | Matsuda et al. | ............ | 358/474 |
| 5,594,502 A * | 1/1997 | Bito et al. | ................... | 348/373 |
| 5,747,825 A * | 5/1998 | Gilblom et al. | ............. | 250/586 |
| 5,757,519 A * | 5/1998 | Yoo | .......................... | 358/475 |
| 5,760,925 A * | 6/1998 | Saund et al. | ................ | 358/497 |
| 5,764,383 A * | 6/1998 | Saund et al. | ................ | 358/497 |
| 5,796,495 A * | 8/1998 | Miyata et al. | ............. | 358/471 |
| 5,894,529 A * | 4/1999 | Ting | .......................... | 382/312 |
| 5,969,829 A * | 10/1999 | Matsuda et al. | ............ | 358/475 |
| 6,236,470 B1 * | 5/2001 | Seachman | ................... | 358/471 |
| 6,320,641 B1 * | 11/2001 | Bauer et al. | .................. | 355/18 |
| 6,480,303 B1 * | 11/2002 | Kawasaki et al. | .......... | 358/474 |
| 6,540,415 B1 * | 4/2003 | Slatter et al. | ............... | 396/428 |
| 6,603,582 B1 * | 8/2003 | Cotte et al. | ................ | 358/474 |
| 6,721,073 B1 * | 4/2004 | Segawa et al. | ............ | 358/475 |
| 6,728,010 B1 * | 4/2004 | Tsutsumi | .................... | 358/475 |
| 6,771,396 B1 * | 8/2004 | Cheatle et al. | ............. | 358/474 |
| 6,885,479 B1 * | 4/2005 | Pilu | .......................... | 358/474 |
| 6,904,183 B1 * | 6/2005 | Slatter | ........................ | 382/284 |

* cited by examiner

*Primary Examiner*—Cheukfan Lee
(74) *Attorney, Agent, or Firm*—Oliff & Berridge, PLC

(57) ABSTRACT

A scanner is provided with a small and low-priced lighting member. The scanner scans an object having undulations on a surface thereof with good quality. The object is placed on a scanning platform. A CCD line sensor incorporated in a camera is positioned facing the scanning platform and scans the object line by line, while moving along an image plane on a lens of an optical scanning system for a specified distance. The lighting member irradiates a scanned position with light from above in a slanting direction under the same condition. The lighting member is moved in synch with the scanned position shifted when the CCD line sensor scans one line, so that the irradiation angle is constant entirely on the object to be scanned. Therefore, shadows of the undulations on the surface of the object are formed under the same conditions as those observed under the natural light without loss of stereoscopic effect of the object.

13 Claims, 8 Drawing Sheets

SCANNER, LIGHTING APPARATUS, AND SCANNING METHOD

BACKGROUND OF THE INVENTION

1. Field of Invention

The invention relates to a scanner for scanning an object having undulations on a surface thereof, a lighting apparatus, and a scanning method.

2. Description of Related Art

A conventional scanner is known that scans an object having undulations on a surface thereof, for example, a double-page spread of a book. The scanner includes a scanning platform, a camera fixedly disposed opposed to the scanning platform, and a lighting apparatus that illuminates the scanning platform with light. The camera has a charged-couple device (CCD) line sensor, an optical system that forms an image of an object on a light receptive surface of the CCD line sensor by a scale-down of the image, and a reading mechanism that moves the CCD line sensor along an image plane.

When a page of a book is scanned, for example, as an object having undulations on a surface thereof, the book is opened to a desired page and placed on the scanning platform, and an image of the double-page spread is scanned by the camera. The camera scans an image through the CCD line sensor that is moved from a scanning start position at one end of a scanning area to a scanning end position at the other end to read in one line of the image. One line of the image data outputted from the CCD line sensor is stored in the memory of the camera, the CCD line sensor is moved for a specified pitch, and a next adjacent line of the image data outputted from the CCD line sensor is stored in memory. In this way, bitmapped image data is stored in memory of the camera, and transferred to an image storage medium of the scanner. If the camera is not provided with memory, the image data is directly stored in the image storage medium.

However, in the above-described scanner, the object to be scanned needs to be entirely illuminated with light of sufficient quantity under the same conditions from outside the scanning area of the camera, so as not to interfere with the scanning of the camera between the camera and the object. As a result, a plurality of lighting apparatuses are installed around the camera. If the camera is far away from the object to be scanned, lighting apparatuses producing a great amount of light are used. When a large-size object, for example, a relief that is a 2 meter square, is scanned, it is difficult to illuminate the entire surface of the object to be scanned with light under the same conditions. The same lighting conditions can be made with a plurality of lighting apparatuses in point of light quantity. However, when a plurality of lighting apparatuses are used, the illuminating direction can not be fixed with respect to every point of the surface of the object. This is because the light irradiating the surface of the object comes from not only a single lighting apparatuse but also other lighting apparatus having equal light quantity at one or more different locations. Therefore, shadows are not produced on the surface of the object in the same direction, and undulations on the surface of the object do not appropriately appear on the image obtained by scanning.

In particular, when the object to be scanned has uniform undulations in height on the surface like the above-described relief, the resultant scanned image of the object may not appear exactly life like to viewers. For example, when the object to be scanned is a relief or a cloth product made by covering a sponge or cotton pad having a fixed thickness with a cloth and stitching it thereon, a pattern with undulations of substantially the same height is formed on a surface thereof. If the lighting conditions are different at each point of the surface of the object to be scanned, shadows of the undulations do not favorably appear on the scanned image. Accurate relief images of a cloth product and relief are required for design quality as viewers tend to evaluate the quality of the image of the pattern showing the undulations on the surface as the quality of the relief or cloth product. As a result, if the quality of the image of the pattern is poor because of the difference in lighting conditions, viewers can not view the pattern correctly.

As described above, the larger an object to be scanned becomes, the worse the undulations of the object are reflected (portrayed) on the image. On the other hand, there is a method to produce an image without shadows of the undulation pattern by using a plurality of lighting apparatuses to increase the amount of light. However, the image without shadows of the undulation pattern appears different from the object scanned when observed in the natural light.

SUMMARY OF THE INVENTION

The invention provides a scanner that scans an object to be scanned having undulations on a surface thereof with good quality, a lighting apparatus in which the amount in light is reduced, and a scanning method.

A scanner for scanning an object to be scanned having undulations on a surface thereof, may include a scanning platform on which the object to be scanned is placed; a scanning member fixedly disposed facing the scanning platform, the scanning member including an image sensor that detects a line image, an optical system that forms an image on the surface of the object to be scanned on a light receptive surface of the image sensor by scale-down, and a scanning device that moves the image sensor along an image plane; a lighting member that applies light from a direction having a predetermined angle to a scanned position in a path which is scanned by the image sensor; and a lighting member interlock device that maintains the direction that the lighting member emits light and adjusts the lighting member in synchronization with the scanned position shifted on the scanning platform in accordance with a movement of the image sensor.

When scanning an object placed on the scanning platform is started, the scanning device in the scanning member causes the image sensor to scan while moving, and the lighting member interlock device moves the lighting member along the scanning platform so as to keep the irradiation angle constant with respect to the scanned position which changes in accordance with the movement of the image sensor. Thus, the irradiation angle of light from the lighting member is the same along the entire surface of the object to be scanned, and shadows due to the undulations on the surface are formed uniformly. In other words, shadows are formed in the same direction with the same length at an area where the undulations on the surface of the object to be scanned are equal in height, and consequently the image can be scanned with quality as high as that when the object is observed under natural light.

BRIEF DESCRIPTION OF THE DRAWINGS

The invention will be described in greater detail with reference to preferred embodiments thereof and the accompanying drawings wherein.

DETAILED DESCRIPTION OF PREFERRED EMBODIMENTS

One embodiment of a scanner embodying the invention will be described in detail with reference to the accompanying drawings. In this embodiment, an object to be scanned is an uneven cloth product wherein stitches are made in lines on a cloth covering a sponge or cotton pad with a fixed thickness, and outer dimensions are 2 meters square.

Figure 1:
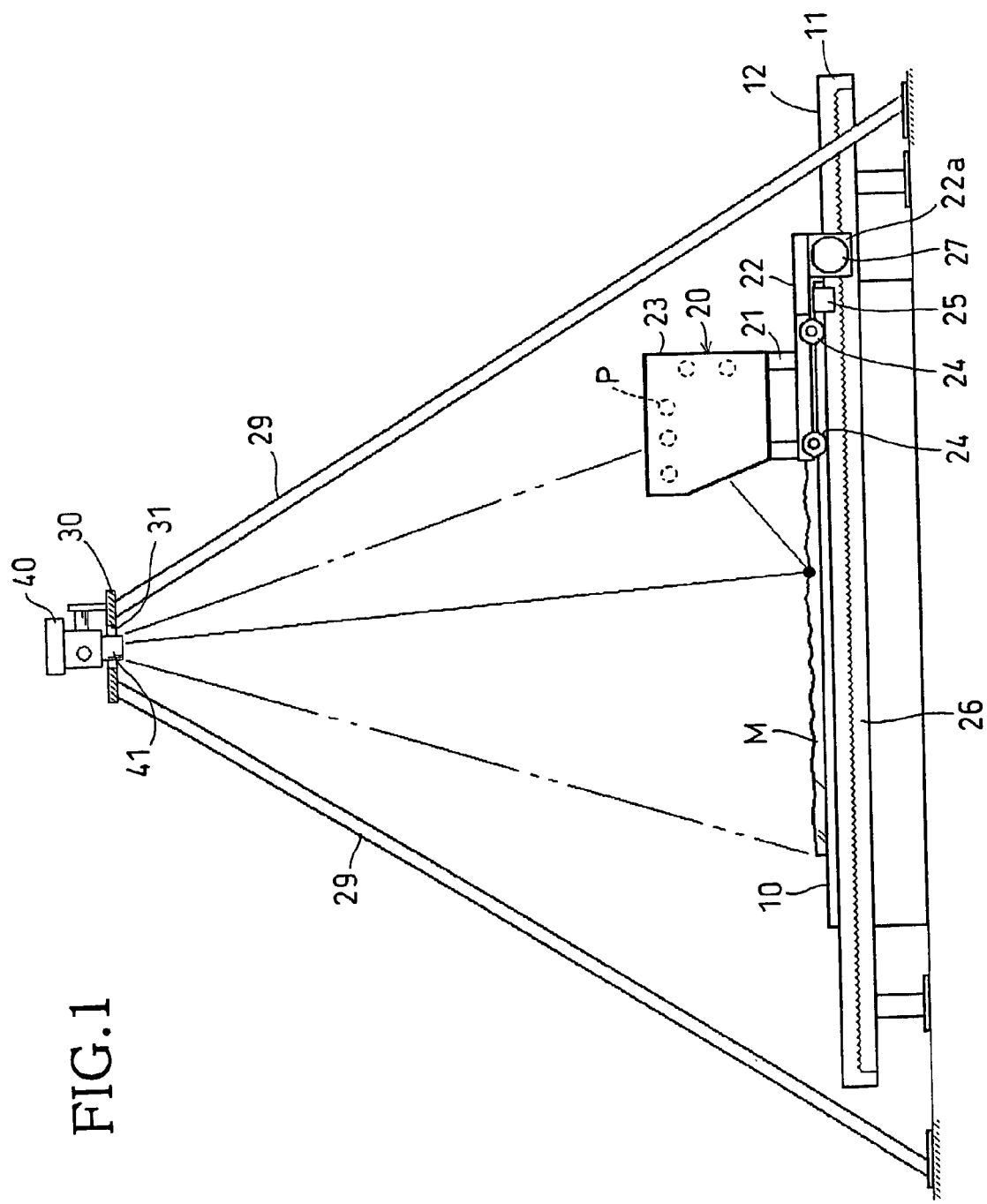
FIG. 1 is a front view of a scanner according to an embodiment of the invention.
Figure 2:
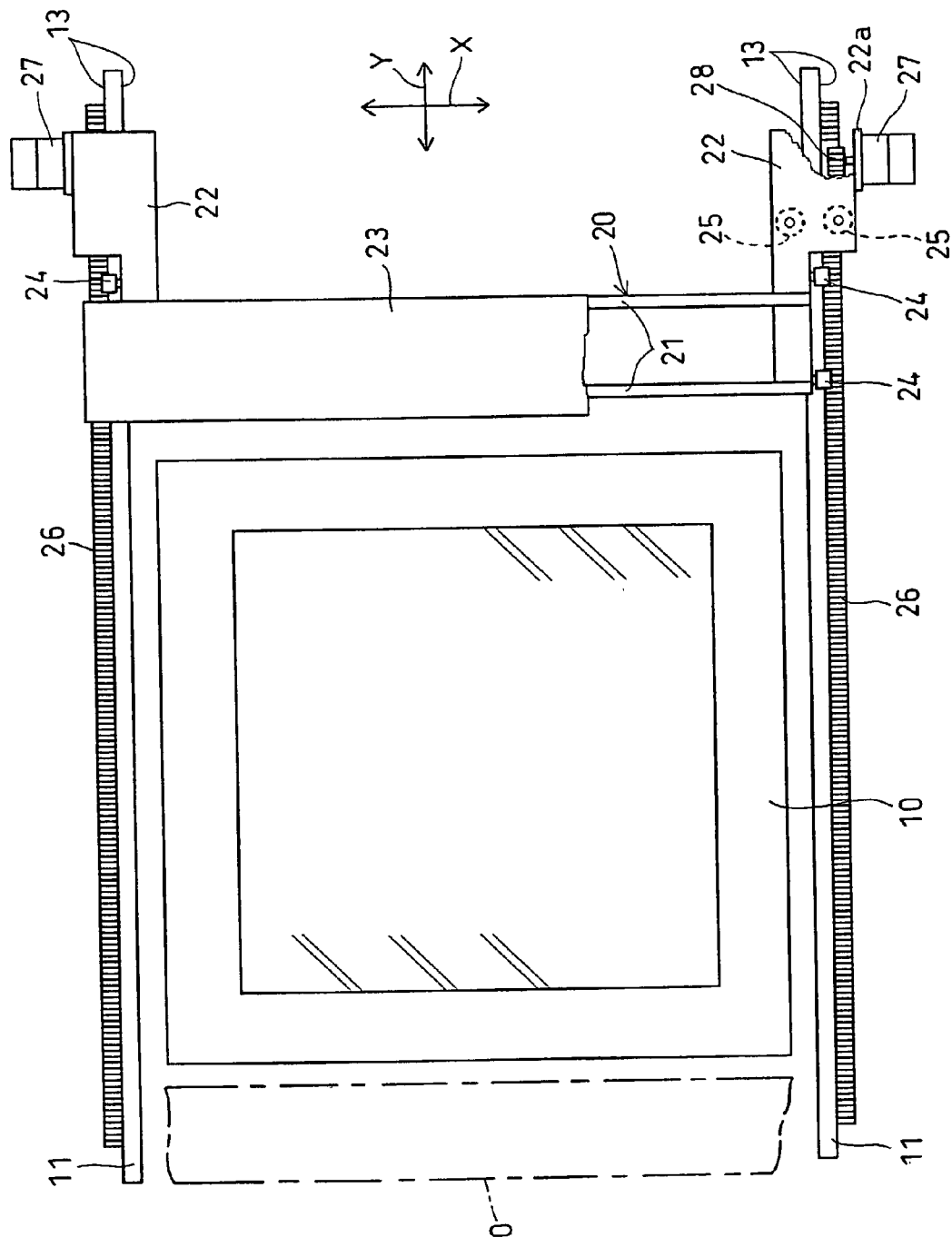
FIG. 2 is a plan view of the general structure of the scanner.

FIG. 1 is a general view of the scanner, and FIG. 2 is a plan view of a scanning platform of the scanner. The scanner includes a scanning platform 10 having a plane surface to place an uneven cloth product of a specified size (a little over 2 by 2 meters in this example). A pair of support rails 11 extending in a Y direction (left to right in FIG. 1) are disposed facing each other on both sides of the scanning platform 10. The support rails 11 are fixedly positioned parallel to each other. The top surfaces of the support rails 11 are support guide surfaces 12 and side surfaces are moving guide surfaces 13 that guide the movement of a lighting support 20.

The lighting support 20 is disposed above each of the support rails 11. The lighting support 20 includes a pair of support plates 22, which are securely connected to both ends of a pair of beams 21 extending in an X direction, orthogonal to the Y direction, and a lighting member 23, which is attached to the beams 21. Support rollers 24 are rotatably attached to each of the support plates 22. The support plates 22 are placed on the support guide surfaces 12 of the support rails 11 via the support rollers 24. A pair of guide rollers 25 is rotatably attached to the undersurface of each of the support plates 22. Each support plate 22 is movable on a corresponding one of the support rails 11 along the moving guide surfaces 13 through the paired guide rollers 25. Rack gears 26 are fixedly mounted on outer sides of the support rails 11. A gear side of each of the rack gears 26 faces the undersurface of each of the support plates 22. Rearward projections 22a are formed at an end of each of the support plates 22. Pulse motors 27 (an example of a drive source) that control the rotational speed are fixed to outer sides of the projections 22a. Motor shafts of the pulse motors 27 (output shafts of the drive sources) pass through the corresponding projections 22a and extend to inner sides of the corresponding projections 22a. Pinion gears 28 that engage with the rack gears 26 are fixed to the motor shafts. Thus, the pulse motors 27 are rotated in the normal or reverse direction to control the rotational speed, so that the lighting support 20 can shuttle between a scanning standby position indicated by a solid line in FIG. 2 and a scanning end position indicated by a dot-dash line.

Figure 3:
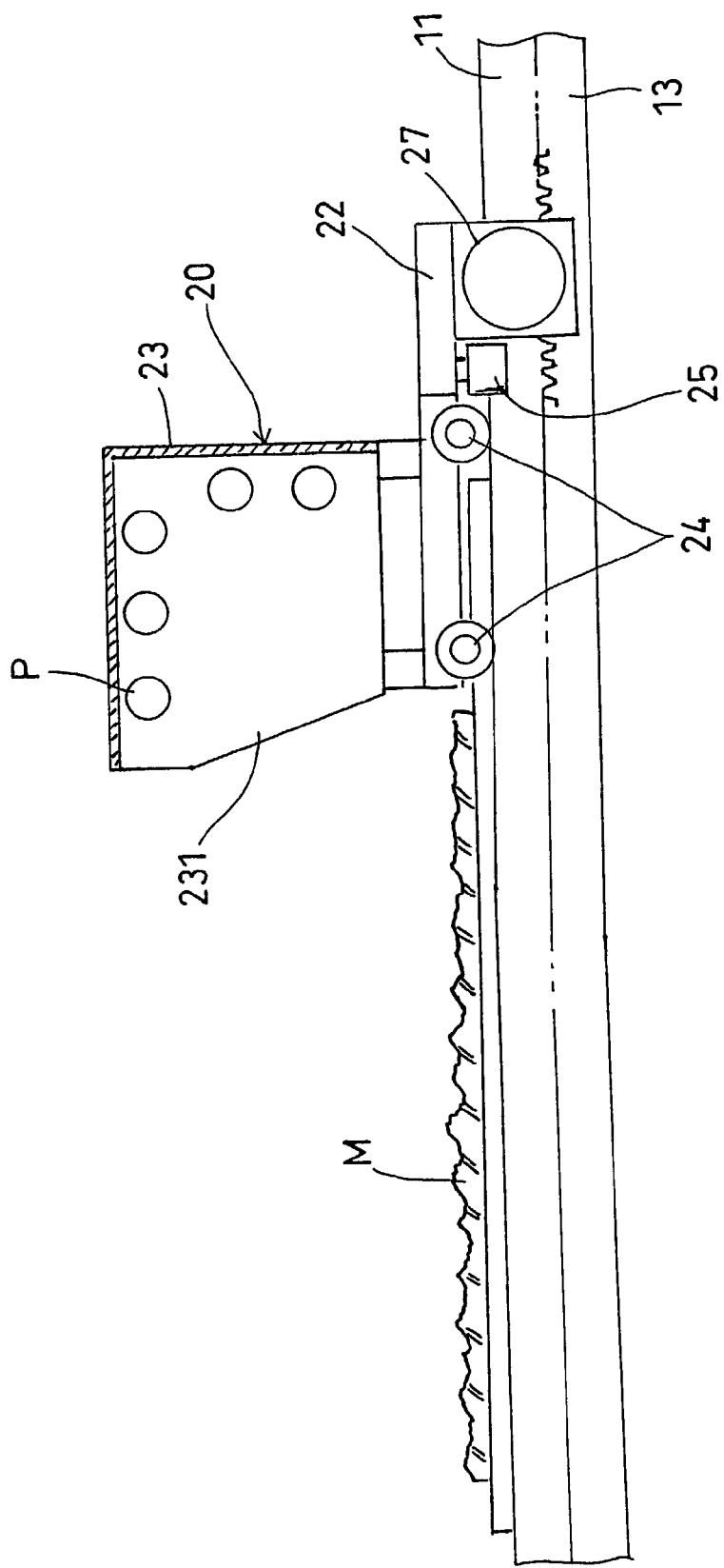
FIG. 3 is an enlarged sectional view showing the structure of a lighting member.

As shown in FIG. 3, the lighting member 23 is hollow and substantially box-shaped. The lighting member 23 has an opening 231 from which the inside of the lighting member 23 is exposed, on a side facing the scanning end position. A plurality of fluorescent lamps P, as a linear light source, are detachably attached to the inside of the lighting member 23 so as to extend in the X direction as shown in FIG. 2. In the drawings, the length of each fluorescent lamp P is longer than the length of the scanning platform 10. The amount of light at an end of a fluorescent lamp P is lower than that at a central part thereof. Thus, the length of each fluorescent lamp P is set to longer than a scanning width (which is a length of the scanning platform 10 in the X direction in this case) to irradiate the full range of the scanning width with the same amount of light through the use of light emitted from the central part of each of the fluorescent lamps P. Light emitted from the fluorescent lamps P projects onto the scanning platform 10 through the opening 231. An irradiation angle is determined that is a direction where the amount of light becomes the largest. In this embodiment, the irradiation angle is set to 45 degrees with respect to the top surface of the scanning platform 10.

When point light sources are used instead of a linear light source, a number of point light sources need to be arranged in tight contact with each other, in a main scanning direction, so as to irradiate the full range of the scanning width with the same light amount. As compared with the use of point light sources, the use of linear light sources has advantages that the number of lights can be decreased and attachment is easy.

A camera stand 30 is supported by four legs 29 (only two legs are shown in FIG. 1) around the scanning platform 10. The camera stand 30 has a centrally positioned through hole 31 through which a camera lens portion 41 of a camera 40 is inserted. The camera 40 is detachably attached to the camera stand 30 with the camera lens portion 41 being inserted into the through hole 31 and secured adjustably along the top surface of the scanning platform 10. The camera lens portion 41 of the camera 40 is placed, in a plan view, in the center of the scanning platform 10.

Figure 4:
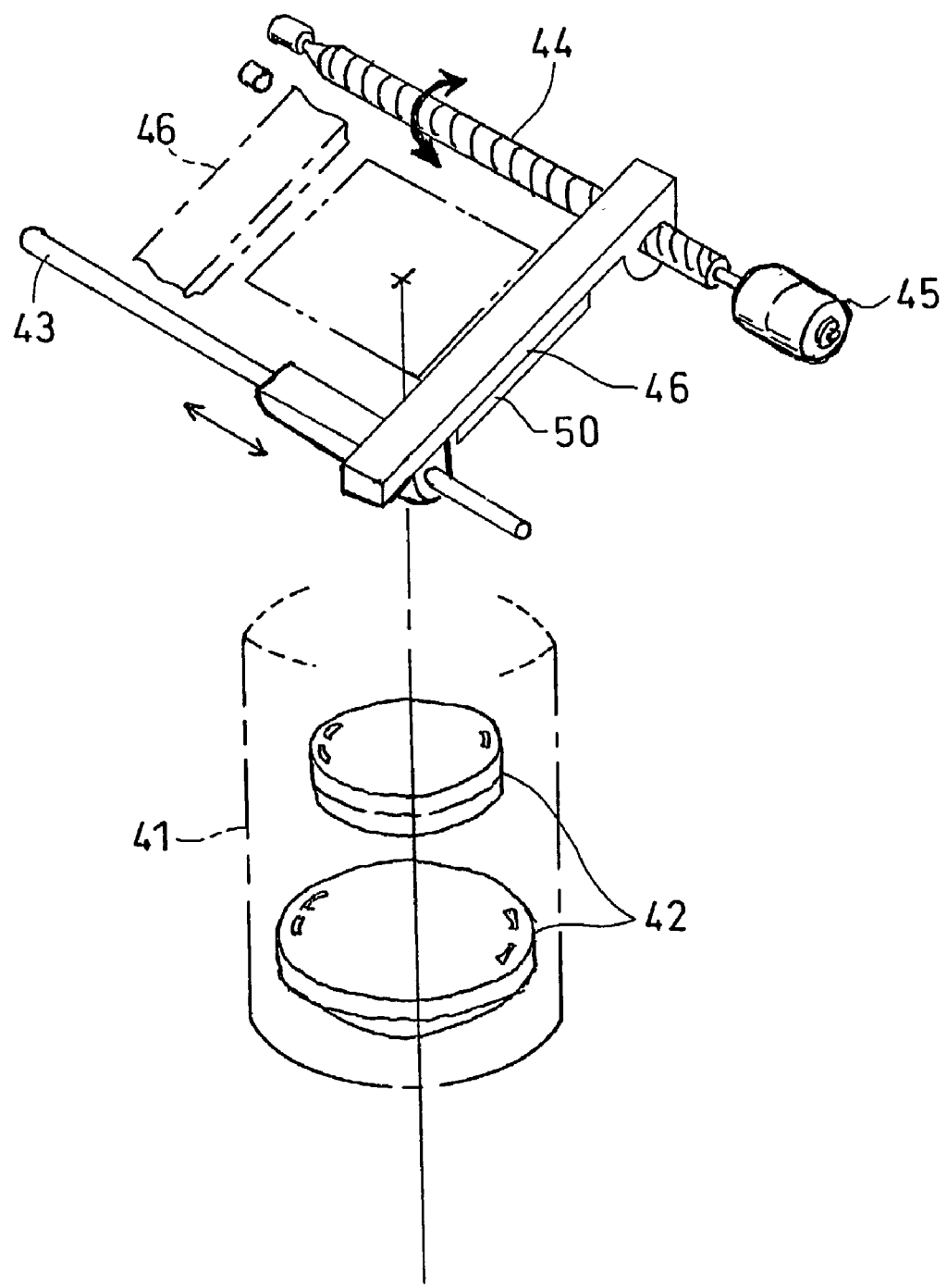
FIG. 4 is a perspective view schematically showing the structure of the scanning member.

Referring to FIG. 4, the camera 40 will be described.

In the camera 40, a scanning system is built into a body of the camera 40 and an optical system is built into the camera lens portion 41. The optical system includes a group of lenses (image formation lenses) 42 and a known focus-adjusting mechanism that adjusts a distance between the lenses 42 and brings a specified image formation position into focus. Magnification of the group of lenses 42 is set to a predetermined value. The group of lenses 42 is detachably attached to the body of the camera 40, and replaced with those having a different power according to the scanning application being performed.

The scanning system causes a CCD line sensor 50 to scan along an image plane of the group of lenses 42 where an optical image of an object to be scanned placed on the scanning platform 10 is formed. A fixing guide shaft 43 and a lead screw 44 are disposed parallel to each other to sandwich the image plane (an imaging area) therebetween. A pulse motor 45, as an example of a drive source for scanning, is coupled to one end of the lead screw 44. In the figure, a motor shaft of the pulse motor 45 is directly coupled to the lead screw 44. However, the pulse motor 45 can be connected to the lead screw 44 via a known speed reduction mechanism. A sensor attaching base 46 has a through hole at one end into which the guide shaft 43 is slidably inserted and a threaded screw hole at the other end in which the lead screw 44 is screwed. The CCD line sensor 50 is attached to an undersurface of the sensor attaching base 46, with a light receptive surface thereof facing the group of lenses 42.

Focusing is performed by the focus-adjusting mechanism so that the image plane of the group of lenses 42 is disposed in the same plane as the light receptive surface of the CCD line sensor 50.

The CCD line sensor 50 is a known sensor wherein a number of image pickup devices are arranged in a line. With an array of dots scanned by each image pickup device, one line of scan data is created. The CCD line sensor 50 is secured to the sensor attaching base 46 in such a manner that a direction of the line of the image pickup devices of the CCD line sensor 50 is parallel to the image plane and orthogonal to the guide shaft 43 (and the lead screw 44) (i.e., aligned in the X direction shown in FIG. 2, also referred to as the main scanning direction). The light receptive surface of the CCD line sensor 50 is flush with the image plane of the group of lenses 42. In the embodiment, the CCD line sensor 50 is designed wherein the image pickup devices are arranged in one line, however, a CCD line sensor where the image pickup devices are arranged in a plurality of lines can be adopted.

When the pulse motor 45 is rotated in the normal or reverse direction, the sensor attaching base 46 (with the CCD line sensor 50) is moved between a scanning standby position indicated by a solid line and a scanning end position indicated by a chain line in FIG. 4. In other words, after the CCD line sensor 50 scans one line of the optical image (in the main scanning direction), it is moved for one line in the Y direction (a sub-scanning direction) and again scans a subsequent line of the optical image. By repeating the above operations, the optical image of the object to be scanned, which is formed on the image plane, is scanned.

Figure 5:
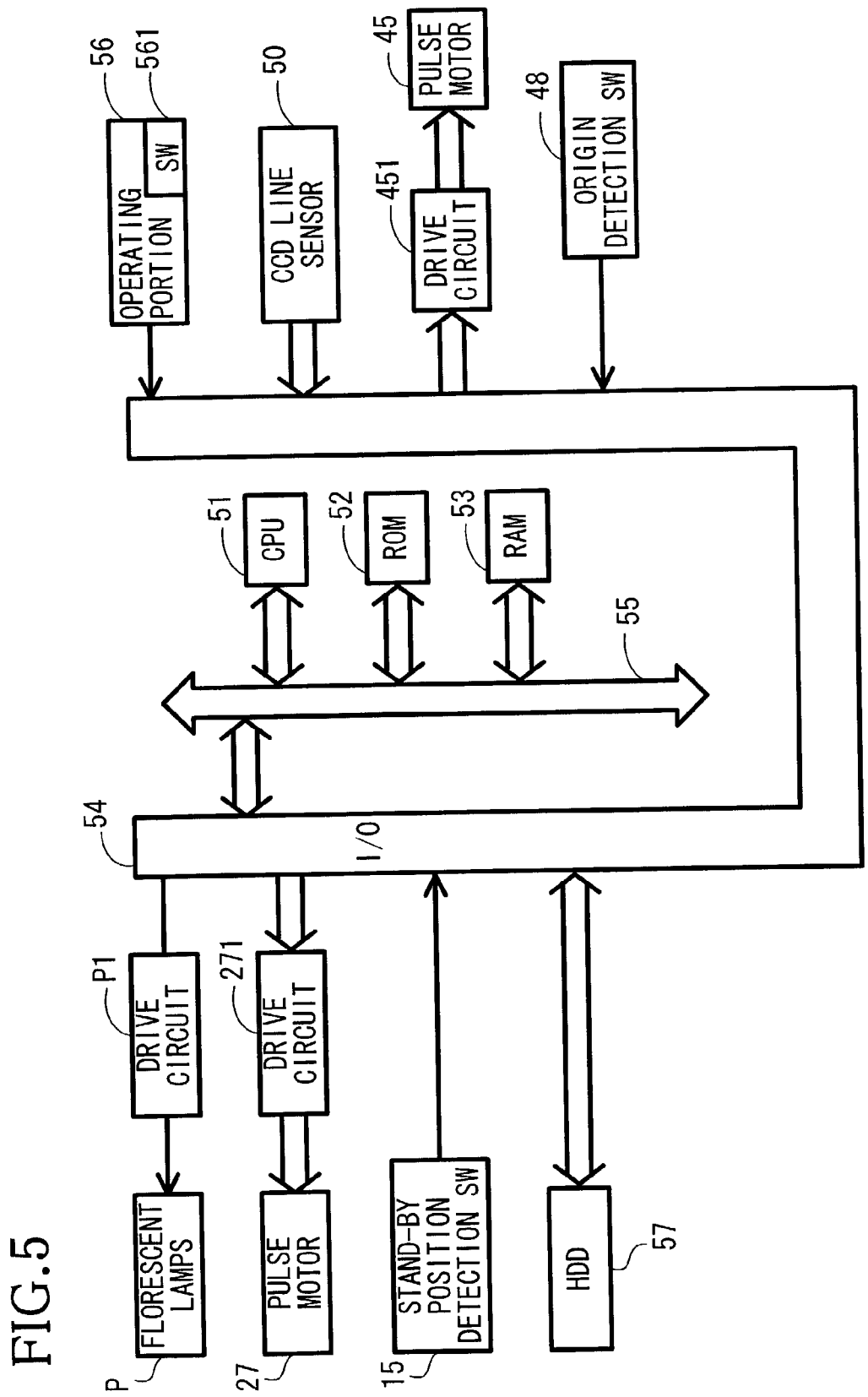
FIG. 5 is a block diagram showing the electrical structure of the scanner.

The electrical structure of the scanner will be described by referring to FIG. 5. The scanner includes the body, the lighting member 23, a lighting member interlock mechanism, a control part, and a scan data storing part. The control part controls each part of the electrical structure.

The control part includes a CPU 51 that controls general operations of the scanner, a ROM 52 that stores control programs for the scanner, a RAM 53 for data processing, an input/output interface 54, and a bus 55 that mutually connects the CPU 51, the ROM 52, the RAM 53, and the I/O interface 54.

The input/output interface 54 is connected to an operating portion 56, the CCD line sensor 50, a drive circuit 451, an origin detection switch 48, a light source drive circuit P1, a drive circuit 271, a standby position detection switch 15, and a hard disk drive (HDD) 57. Other storage medium could also be used, such as CD3, DVD and floppy disks or any other rewritable non-volatile recording material. The operating portion 56 is used for inputting various operational requests and includes a scanning start switch 561 for inputting a scanning start order. The CCD line sensor 50 is an example of a line sensor provided in the body. The drive circuit 451 drives the pulse motor 45 to move the CCD line sensor 50 in the sub-scanning direction. The origin detection switch 48 detects an origin that is a standby position of the CCD line sensor 50 in the sub-scanning direction. The light source drive circuit P1 drives the florescent lamps P as light sources of the lighting member. The drive circuit 271 drives the pulse motor 27 to move the lighting member in the sub-scanning direction. The standby position detection switch 15 detects a standby position of the lighting member, and the HDD 57 subsequently stores scan data taken line by line by the CCD line sensor 50.

The ROM 52 stores a lighting member movement table prepared by comparing magnification of the lenses, a sensor moving distance, and a lighting member moving distance. The sensor moving distance is a sensor width of the CCD line sensor 50 reading one line and moving in the sub-scanning direction regarding a length between the group of lenses 42 and the scanning platform 10 as a parameter. The lighting member moving distance is a scanning width in the scanning area on the scanning platform 10 in the sub-scanning direction when the sensor width is determined.

The RAM 53 is divided into a magnification storage area for storing a power of the lenses 42 input from the operation part 56, a distance storage area for storing a distance between the lenses 42 and the scanning platform 10 input from the operation part 56, a lighting member moving distance storage area for storing a distance to move the lighting member 23 after each line is scanned, and a sensor moving distance storage area for storing a distance to move the CCD line sensor 50 in the sub-scanning direction after each line is scanned. The CPU 51 controls each part based on data stored as described.

Figure 6:
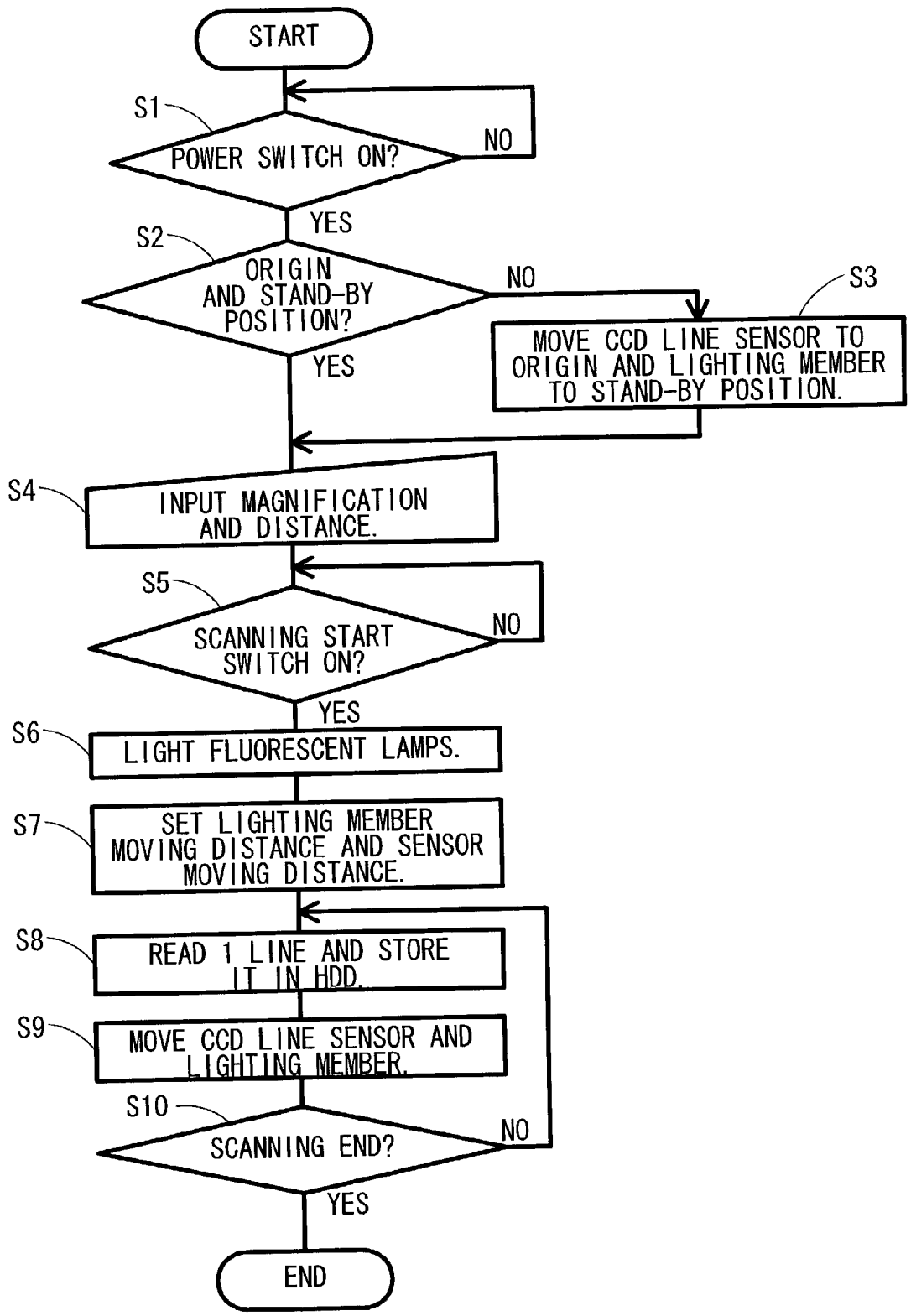
FIG. 6 is a flowchart of the operation of a CPU.

The operation of the scanner will be described with the flowchart of FIG. 6. An object to be scanned having an irregular surface, such as a relief, is placed on the scanning platform 10. When the power is turned on (S1: Yes), the CPU 51 reads signals from the origin detection switch 48 and the standby position detection switch 15, and determines whether the origin has been detected or the standby position has been detected. When the origin and the standby position are not detected (S2: No), the pulse motor 45 is driven to move the CD line sensor 50 to its origin, and the pulse motor 27 is driven to move the lighting member 23 to its standby position (S3).

As scanning requirements, a magnification of the lenses 42 and a distance between the lenses 42 and the scanning platform 10 are input from the operational part 56 (S4). When the scanning start switch 561 is turned on (S5: Yes), the CPU 51 lights the florescent lamps P of the lighting member 23 (S6). The CPU 51 reads the magnification of the lenses 42 and the distance between the lenses 42 and the scanning platform 10 input at S4 from the specified storage areas in the RAM 53, and then reads the lighting member moving distance and the sensor moving distance, which correspond to the magnification and the distance input at S4, from the table in the ROM 52, and stores them in the specified areas of the RAM 53 (S7).

The CPU 51 then reads one line of scan data output by the CCD line sensor 50, and writes it in the HDD 57, which is an example of a nonvolatile rewritable storage device (S8). After writing, the CPU 51 reads the lighting member moving distance and the sensor moving distance from the lighting member moving distance storage area and the sensor moving distance storage area in the RAM 53. The CPU 51 causes the pulse motors 27, 45 to rotate so as to move the lighting member 23 and the CCD line sensor 50 for the specified distance (S9). As a result, the CCD line sensor 50 is moved for one line on the image plane of the lenses 42, and a position scanned on the scanning platform 10 is also shifted in accordance with distance the CCD line sensor 50 has been moved. The lighting member 23 is also moved for the lighting member moving distance in accordance with the distance the scanned position has been shifted. After that, if there remains a portion to be scanned (S10: No), the process returns to S8. When all is scanned (S10: Yes), the CPU 51 finishes the process.

As the distance the scanned position has been shifted is equal to the lighting member moving distance which is found based on the magnification of the lenses 42 and the distance between the lenses 42 and the scanning platform 10, the relative distance between the scanned position and the lighting member 23 is always maintained constant. Thus, the irradiation angle of light emitted from the lighting member 23 is always kept constant with respect to the scanned position, which is shifted in order. As described above, the irradiation angle is an angle of the light becoming the strongest in the scanned position. In other words, it means a direction a shadow is formed.

Thus, with respect to an object to be scanned having undulations on a surface thereof, such as a relief and a cloth product, the irradiation angle of light is the same the over entire surface having the undulations, and shadows due to the undulations on the surface are formed in a fixed direction. As a result, as long as the undulations on the surface of the object to be scanned are equal in height, the shadows to be formed become identical in length in any place. Thus, an object of which aesthetic appreciation is required of the undulations, such as a relief or a cloth product, can be scanned under lighting conditions equal to that of natural light (parallel light). Even when scan data obtained by scanning is displayed on a display apparatus or printed on a sheet of paper, quality equal to that which a viewer directly sees when viewing the original (the object to be scanned) under the natural light condition can be obtained. Thus, the viewer can correctly recognize and appreciate of the original from the display image or printed image.

The invention is not limited to the embodiment, but may be applied to various modifications. For example, the lighting member 23 may be moved after a scanning operation by the CCD line sensor 50 is completed and the image data is stored in the memory. That is, the lighting member 23 will intermittently repeat moving and pausing. In this modification, when the lighting member 23 is large and its inertial weight is great, it will sustain a heavy load at its drive source during the repetition of moving and pausing at high speed. On the other hand, in the above embodiment, the lighting member 23 is controlled to move at a constant speed instead of repeating moving and pausing. Therefore, a shifting speed of the position scanned by the CCD line sensor 50 can be uniquely calculated based on the moving speed of the CCD line sensor 50, the magnification of the lenses 42, and the distance between the lenses 42 and the scanning platform 10. The drive source (pulse motor 27) is controlled so as to rotate at the calculated speed.

Figure 7:
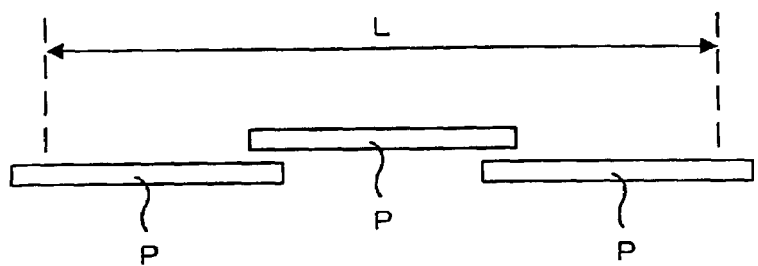
FIG. 7 shows a modification of an arrangement of a liner light source in a lighting member.

As a light source of the lighting member 23, a linear light source longer than the scanning width is used. However, if the scanning width becomes wider in order to scan a larger object, it is difficult to obtain a linear light source commensurate with the scanning width, or even if such a linear light source is obtained, it will be very expensive. Instead, a plurality of linear light sources shorter than the scanning width, for example, fluorescent lamps P1 shorter than the scanning width, can be placed in series, as an array of linear line sources. In this case, the amount of light at an end of a fluorescent lamp P1 is lower than that in a central part, as a luminous property. When the fluorescent lamps P1 are simply placed in series, the amount of light varies along the scanning width. To resolve the variance, the fluorescent lamps P1 may be placed along the scanning width L so as to make ends of the fluorescent lamps P1 overlap each other as shown in FIG. 7. If the amount of light is insufficient, a plurality of arrays of the linear light sources placed above can be used.

Figure 8:
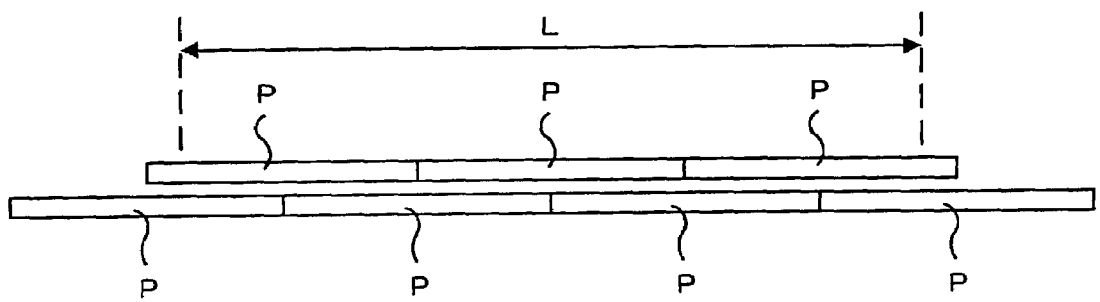
FIG. 8 shows a further modification of an arrangement of the line source in the lighting member.

As an array of the linear light sources is made such that the florescent lamps P1 are arranged so as to make the ends overlap each other, an installation area for an array of linear light sources becomes large, and the installation area increases in proportion to the number of arrays of linear light sources. Therefore, in this case, a plurality of arrays of the linear light sources placed end to end may be made so as to make end portions of an array adjacent to middle portions of another array, as shown in FIG. 8. With this arrangement, the installation area can be reduced.

Figure 9:
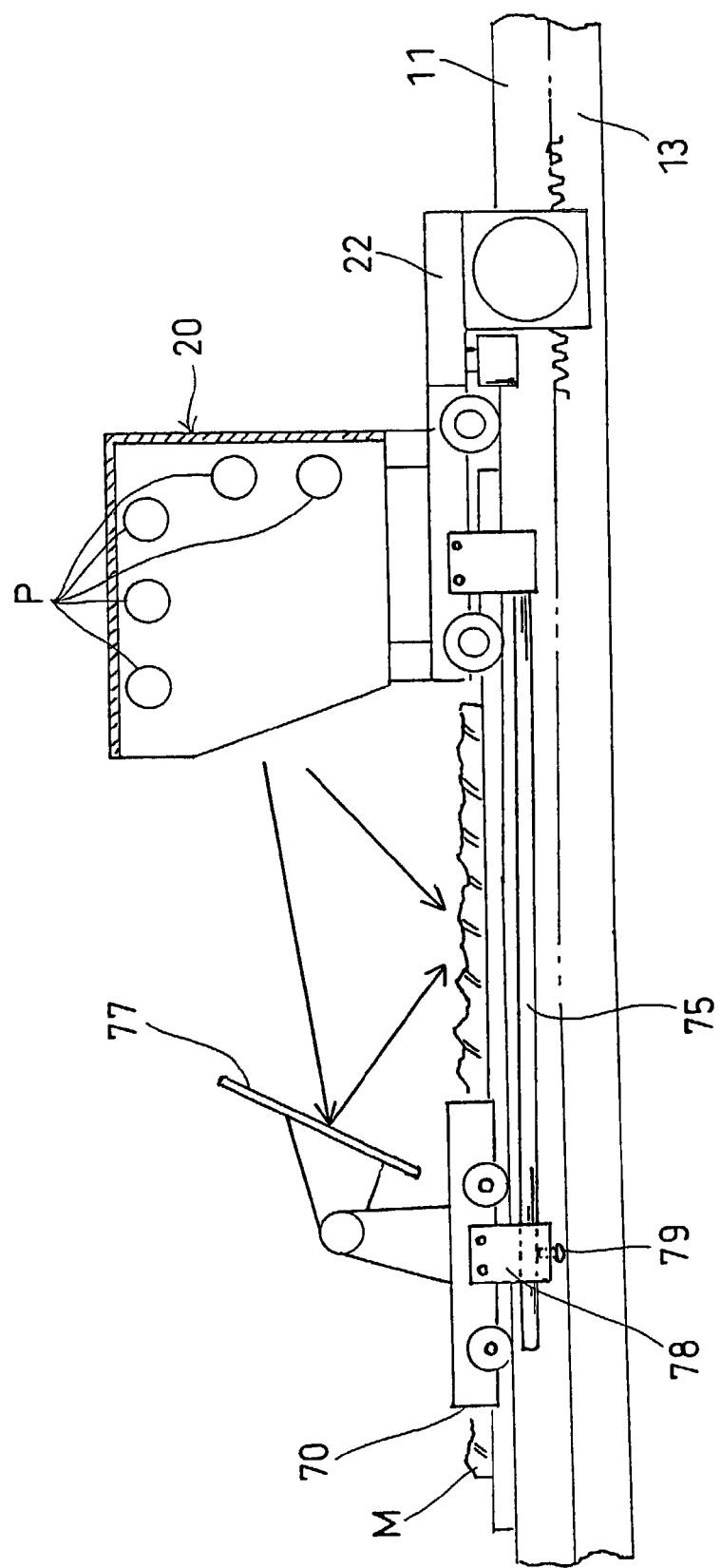
FIG. 9 is an enlarged front view showing a structure of a lighting member including a reflector according to another embodiment of the invention.

When the shadows of undulations of the object to be scanned are too thick because the amount of light emitted from the lighting member 23 is too strong, the amount of light lower than that with which the shadows are formed may be applied from a direction different from the irradiation angle of light with which the shadows are formed. This enables the shadows to thin and allows the formation of true-to-life shadows in the scanned image of the object. As an example, as shown in FIG. 9, a reflector carriage 70, that is movable on the support rails 11, is provided. The reflector carriage 70 is connected to the support plates 22, that support the lighting member 23, via connecting shafts 75 that are adjustable in length. A reflector 77 is attached to the reflector carriage 70 so as to rotate on an axis parallel to the main scanning direction. A surface of the reflector 77 serves as a reflective surface, and faces toward the lighting member 23. Therefore, light emitted from the lighting member 23 not only directly falls on the object M, but also falls on the reflector 77 and is reflected onto the object M. At this time, when the reflector 77 is made of a material with reflectance of a value lower than 1, preferably 0.5, shadow contrast can be easily adjusted. To adjust the distance between the reflector 77 and the lighting member 23, the connecting shafts 75 are fixed to the support plates 22 parallel to the support rails 11, slidably inserted into holes on each of the two, opposing holders 78 secured to the reflector carriage 70, so that the holders 78 and the connecting shafts 75 are releasably connected using screws 79. In other words, FIG. 9 shows a distance adjusting means for adjusting the distance between the lighting member 23 and the reflector 77, and a fixing means for fixing the distance between the lighting member 23 and the reflector 77 at the adjusted position. Therefore, the reflector 77 is moved in synchronization with the lighting member 23. However, there is no need to secure the reflector 77 to the lighting member 23. The reflector 77 can be moved at the same speed as the lighting member 23 by providing an additional drive source that only moves the reflector 77 along the support rails 11, as with the lighting member 23. In such a case the reflector 77 drive motor must be synchronized with the lighting member 23 and the CCD line sensor 50. As the reflector 77 is moved relative to the object M while maintaining the positional relationship with the lighting member 23, the direction of light from the lighting member 23 and a direction of indirect light from the reflector 77 are maintained constant in each of scanned positions shifted in sequence. Therefore, the contrast of shadows due to the undulations on the object M can be adjusted uniformly at all scanned positions.

In the above embodiment, the camera 40 is integral with the scanner, but may be separated from the scanner and detachably secured to the camera stand 30. In this case, a commercially available camera is mounted on the camera stand 30, a scanning speed of the camera is measured, and the moving speed of the lighting member 23 is determined from the scanning speed, a distance between the camera and the scanning platform 10, and magnification of lens of the camera, so that the lighting member 23 can be moved in accordance with a timing with which the camera performs scanning.

In any of the above modifications, the irradiation angle of the light can be maintained constant relative to the entire surface of the object, the shadows of the undulations on the surface of the object can be reproduced on the image plane in good condition, thereby obtaining the object with good stereoscopic effect.

In the scanner according to the above embodiment, the lighting member 23 is controlled such that it is moved for a specified distance in a timed relationship with a completion of scanning of one line of the image data by the CCD line sensor 50. That is, the lighting member 23 is moved reliably when scanning of one line of the image data is completed. As a result, any position the CCD line sensor 50 scans is always illuminated with light from the lighting member 23 during a scanning operation, and an image with good quality can be reliably obtained.

What is claimed is:

1. A scanner for scanning an object having undulations on a surface thereof, comprising:
    a scanning platform on which the object is placed;
    a scanning member fixedly disposed with respect to the scanning platform and facing the scanning platform, the scanning member including an image sensor that detects a line image, an optical system that forms an image on the surface of the object on a light receptive surface of the image sensor by scale-down, and a scanning device that moves the image sensor along an image plane;
    a lighting member that applies light from a direction having a predetermined angle to a scanned position in a path which is scanned by the image sensor; and
    a lighting member interlock device that maintains the direction that the lighting member illuminates light and brings the lighting member in synchronization with the scanned position shifted on the scanning platform in accordance with a movement of the image sensor.

2. The scanner according to claim 1, wherein the lighting member interlock device comprises a lighting member moving device that moves the lighting member along the scanning platform, and a movement control device that controls the lighting member moving device such that the lighting member is moved for a specified amount in a timed relationship with a completion of scanning the line sensor by the image sensor.

3. The scanner according to claim 1, wherein the lighting member is a linear light source extending toward a direction perpendicular to a moving direction of the lighting member interlock device.

4. The scanner according to claim 3, wherein the lighting member includes a plurality of linear light sources each shorter than a scanning width of the image sensor, which is enlarged by the optical system, and the linear light sources arranged along the scanning width such that ends of the linear light sources overlap each other.

5. The scanner according to claim 3, wherein the lighting member includes a plurality of arrays of linear light sources placed end to end along the scanning width, and the plurality of arrays of linear light sources are made such that end portions of one array are adjacent to middle portions of another array.

6. The scanner according to claim 1, wherein the lighting member further comprises a reflector that reflects light incident from a light source and causes the light to fall on the scanned position of the object.

7. A lighting apparatus for scanning an object having undulations on a surface thereof, comprising:
    a scanning member fixedly disposed with respect to a scanning platform and facing the scanning platform, the scanning member including an image sensor that detects a line image, an optical system that forms an image on the surface of the object on a light receptive surface of the image sensor by scale-down, and a scanning device that moves the image sensor along an image plane;
    a lighting member that illuminates light from a direction having a predetermined angle sloped with respect to a scanned position where the image sensor scans the object; and
    a lighting member interlock device that maintains the direction that the lighting member illuminates light and moves the lighting member in synchronization with the scanned position shifted on the scanning platform in accordance with a movement of the image sensor.

8. The lighting apparatus according to claim 7, wherein the lighting member interlock device comprises a lighting member moving device that moves the lighting member along the scanning platform, and a movement control device that controls the lighting member moving device such that the lighting member is moved for a specified amount in a timed relationship with a completion of scanning the line by the image sensor.

9. The lighting apparatus according to claim 7, wherein the lighting member is a liner light source extending in a direction perpendicular to a moving direction of the lighting member interlock device.

10. The lighting apparatus according to claim 9, wherein the lighting member includes a plurality of linear light sources each shorter than a scanning width of the image sensor, which is enlarged by the optical system, and the linear light sources arranged along the scanning width such that ends of the linear light sources overlap each other.

11. The lighting apparatus according to claim 9, wherein the lighting member includes a plurality of arrays of linear light sources placed end to end along the scanning width, and the plurality of arrays of linear light sources are made such that end portions of one array are adjacent to middle portions of another array.

12. The lighting apparatus according to claim 7, wherein the lighting member further comprises a reflector that reflects light incident from a light source and causes the light to fall on the scanned position of the object.

13. A scanning method, comprising the steps of:
    placing an object to be scanned having undulations on a surface thereof on a scanning platform fixedly disposed with respect to a scanning member and the scanning member facing the scanning platform, the scanning member including an image sensor that detects a line image, an optical system that forms an image on the surface of the object on a light receptive surface of the image sensor by scale-down, and a scanning device that moves the image sensor along an image plane;
    moving the image sensor to start scanning the object; and
    moving a lighting member that illuminates a scanned position where the image sensor scans the object with light from a direction having a predetermined angle sloped with respect to the scanned position in synchronization with the scanned position shifted on the scanning platform in accordance with a movement of the image sensor, while maintaining the direction that the lighting member illuminates light.

* * * * *